United States Patent
Yoshida (10) Patent No.: US 12,493,938 B2
(45) Date of Patent: Dec. 9, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hiroki Yoshida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 18/365,058

(22) Filed: Aug. 3, 2023

(65) Prior Publication Data
US 2024/0046431 A1 Feb. 8, 2024

(30) Foreign Application Priority Data
Aug. 4, 2022 (JP) .................. 2022-124713

(51) Int. Cl.
*G06T 5/80* (2024.01)
*G06T 7/11* (2017.01)
*G06V 20/58* (2022.01)

(52) U.S. Cl.
CPC .................. *G06T 5/80* (2024.01); *G06T 7/11* (2017.01); *G06V 20/58* (2022.01)

(58) Field of Classification Search
CPC .............. G06T 5/80; G06T 7/11; G06V 20/58
See application file for complete search history.

(56) References Cited

U.S. PATENT DOCUMENTS

| | | | |
|---|---|---|---|
| 10,447,948 B2 | 10/2019 | Aihara et al. | |
| 2010/0110189 A1* | 5/2010 | Kuboyama | B60R 1/12 |
| | | | 348/E5.022 |
| 2012/0050470 A1* | 3/2012 | Oba | H04N 23/81 |
| | | | 348/43 |
| 2019/0191064 A1* | 6/2019 | Aihara | B60R 1/26 |
| 2021/0046870 A1* | 2/2021 | Maekawa | H04N 23/80 |

FOREIGN PATENT DOCUMENTS

| | | | | |
|---|---|---|---|---|
| CN | 111899189 A | * | 11/2020 | ........... G06F 18/214 |
| JP | 2009012652 A | | 1/2009 | |

(Continued)

OTHER PUBLICATIONS

Lee et al. "Correction of Barrel Distortion in Fisheye Lens Images Using Image-Based Estimation of Distortion Parameters." IEEE Access 7 (2019): 45723-45733. (Year: 2019).*

(Continued)

*Primary Examiner* — Katrina R Fujita
(74) *Attorney, Agent, or Firm* — Canon U.S.A., Inc. IP Division (57) ABSTRACT

An image processing apparatus includes an acquisition unit that acquires a first image obtained by capturing an optical image by an optical system including a high distortion region in which distortion is large and a low distortion region in which distortion is small, a cutout unit that cuts out a partial image region from the first image to acquire a second image, and an expansion processing unit that expands the second image at an expansion magnification corresponding to distortion of the optical system, wherein the second image subjected to the expansion by the expansion processing unit is output to a display device.

13 Claims, 9 Drawing Sheets

(56) References Cited

FOREIGN PATENT DOCUMENTS

JP    2013005393 A  *  1/2013
JP      6349558 B1     7/2018

OTHER PUBLICATIONS

Lin et al. "Construction of fisheye lens inverse perspective mapping model and its applications of obstacle detection." EURASIP Journal on Advances in Signal Processing 2010.1 (2010): 296598. (Year: 2010).*

Wang et al. "Tri-SIFT: A triangulation-based detection and matching algorithm for fish-eye images." Information 9.12 (2018): 299. (Year: 2018).*

* cited by examiner

IMAGE PROCESSING APPARATUS, IMAGE PROCESSING METHOD, AND STORAGE MEDIUM

BACKGROUND

Field

The present disclosure relates to an image processing technology for generating an image to be displayed on a display device from a captured image.

Description of the Related Art

There is an image display system that displays a moving image captured by a camera attached to the rear of a vehicle, such as an automobile, on an in-vehicle display and an electronic rearview mirror. Hereinafter, the camera attached to the rear of the vehicle is referred to as a rear camera, and the moving image captured by the rear camera is referred to as a rear image. The rear camera is often provided with an optical system that can obtain a wide angle of view. Since such an optical system having a wide angle of view is likely to have large distortion, distortion correction is performed on the rear image acquired by the rear camera. In addition, there is an image display system in which, for example, an image of a region directly behind the vehicle is cut out from the rear image and displayed in the electronic rearview mirror.

Japanese Patent No. 6349558 discloses an image pickup apparatus including an optical system having optical characteristics such that the magnification ratio of light forming an image differs between a first region and a second region on an image pickup surface. Japanese Patent No. 6349558 discloses a first region being a local region in a second region, an image of the second region being subjected to distortion correction and displayed on an in-vehicle display, and an image of the first region being cut out from the distortion corrected image and displayed on an electronic rearview mirror.

Some image display systems can switch an image displayed on an in-vehicle display to an image of a region of interest, such as an image directly behind the vehicle or an image below the vehicle. In the case of such a system, the distortion correction method for the rear image is also appropriately switched based on the switching of the region of interest to be displayed. However, when the distortion correction method is switched, the image of the region cut out from the rear image after the distortion correction to be displayed on the electronic rearview mirror also changes, and usability is impaired. In this case, it is conceivable to provide a configuration for performing dedicated distortion correction processing on the image of the region cut out to be displayed on the electronic rearview mirror, but this increases the circuit size and cost. In particular, it is desirable that the image displayed on the electronic rearview mirror is an image of a high frame rate, but since the distortion correction processing takes a certain amount of processing time, the delay becomes large, and there is a possibility that a desired frame rate cannot be obtained. If the distortion correction is not performed on the image of the region cut out to be displayed on the electronic rearview mirror in order to reduce the delay, a deformed image with a large distortion remaining is displayed, and the image becomes very difficult to visually recognize.

SUMMARY

The present disclosure is directed to allowing display of an easily visible image while reducing in increase in circuit size and cost, and delay in processing time.

According to an aspect of the present disclosure, an image processing apparatus includes an acquisition unit configured to acquire a first image obtained by capturing an optical image by an optical system including a high distortion region in which distortion is large and a low distortion region in which distortion is small, a cutout unit configured to cut out a partial image region from the first image to acquire a second image, and an expansion processing unit configured to expand the second image at an expansion magnification corresponding to distortion of the optical system, wherein the second image subjected to the expansion by the expansion processing unit is output to a display device.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the drawings. The exemplary embodiments described below are not intended to be limiting, and all combinations of features described in the exemplary embodiments are not necessarily essential to solving means of the present disclosure. The configurations of the exemplary embodiments can be appropriately modified or changed depending on the specifications and various conditions (for example, use conditions and use environments) of an apparatus to which the present disclosure is applied. In addition, a part of each exemplary embodiment described below can be appropriately combined. In the following exemplary embodiments, the same components are denoted by the same reference numerals.

Figure 1A:
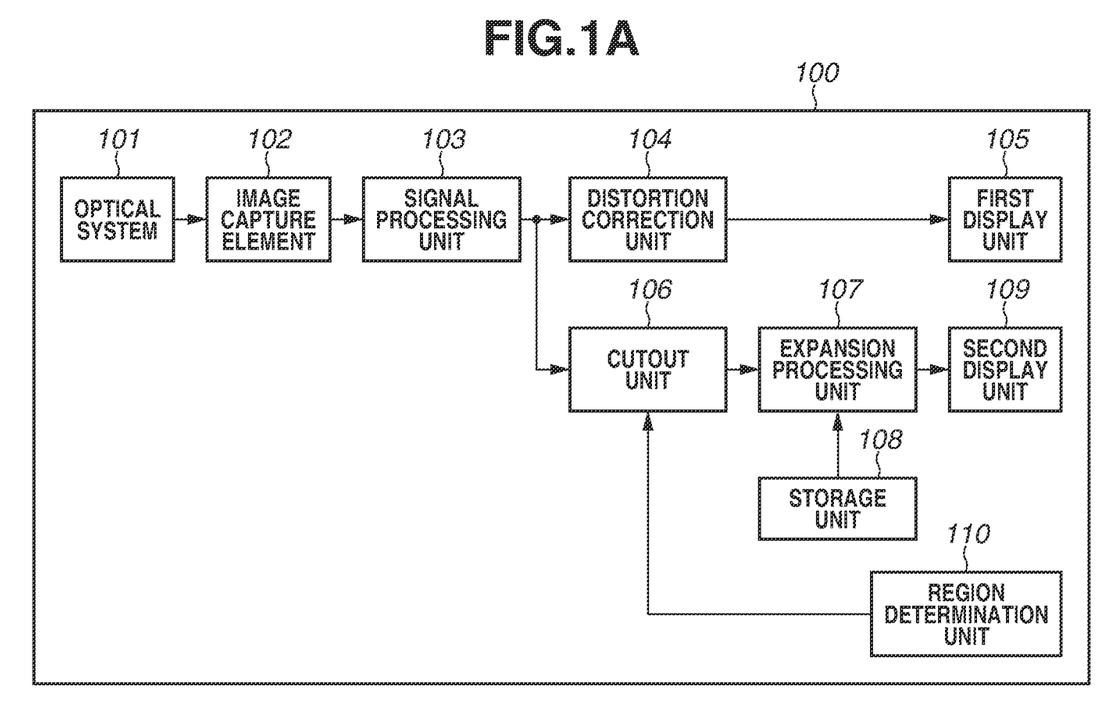
FIGS. 1A and 1B are diagrams illustrating an example of a functional configuration and a hardware configuration of a first exemplary embodiment.
Figure 1B:
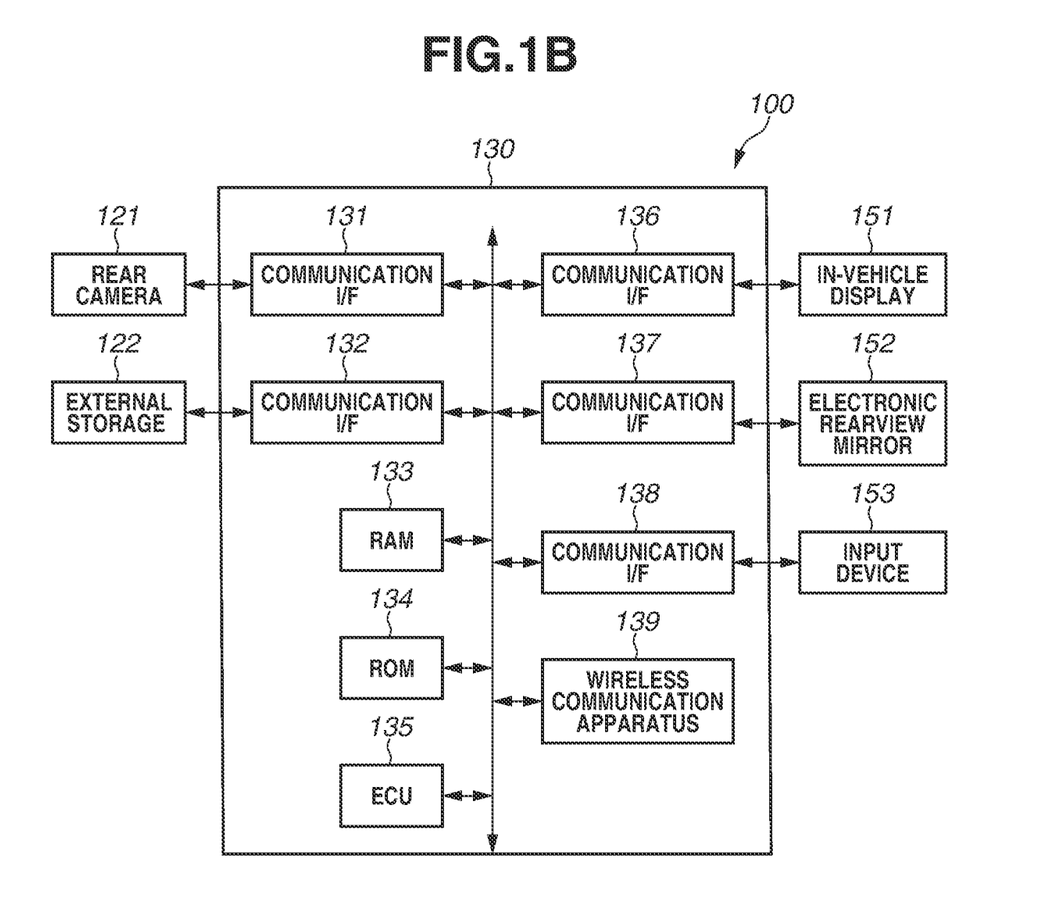

A first exemplary embodiment will now be described. FIG. 1A is a block diagram illustrating a functional configuration example of an image processing system including an image processing apparatus 100 according to the first exemplary embodiment. FIG. 1B is a diagram illustrating an example of a hardware configuration of the information processing system 100 according to the present exemplary embodiment. The information processing system 100 exemplified in the present exemplary embodiment is a system mounted on a vehicle, such as an automobile.

The information processing system 100 according to the present exemplary embodiment is, for example, a system that can display a moving image (rear image) captured by a camera (rear camera 121) attached to the rear of an automobile on an in-vehicle display 151 and an electronic rearview mirror 152. The rear camera 121 includes an optical system 101 and an image capture element 102 in FIG. 1A. Details of the optical system 101 and the image capture element 102 will be described below. The rear camera 121 is connected to an information processing apparatus 130 mounted on the vehicle via a communication interface (I/F) 131. In FIG. 1A, a first display unit 105 corresponds to the in-vehicle display 151, and a second display unit 109 corresponds to the electronic rearview mirror 152.

The in-vehicle display 151 is attached to, for example, a dashboard in the vehicle, and is connected to the information processing apparatus 130 by a communication I/F 136. The in-vehicle display 151 displays a map, route guidance information, a television screen, channel selection information, various kinds of setting information, and the like, and can also display a rear image. The information about the map, the route guidance, the television screen, the channel selection information, and the various kinds of setting information are appropriately switched and displayed when the vehicle moves forward (travels) or stops. The display of the rear image on the in-vehicle display 151 is performed when the vehicle moves backward. As a result, the driver of the vehicle can check the situation behind the vehicle when moving the vehicle backward.

The electronic rearview mirror 152 is a display device that is attached to, for example, an upper portion of a front window of the vehicle and can display a region directly behind the vehicle, that is, an image similar to a range that can be seen on a general rearview mirror, in the rear image captured by the rear camera 121. The electronic rearview mirror 152 is connected to the information processing apparatus 130 via a communication I/F 137. The electronic rearview mirror 152 displays an image directly behind the vehicle when the vehicle is moving forward (while traveling) or backward, or when the vehicle is stopped. This enables the driver of the vehicle to check the situation behind the vehicle when the vehicle is moving forward (traveling), moving backward, or stopped.

An electronic control unit (ECU) 135 is an in-vehicle microcomputer and performs overall control in the vehicle, for example, operation control of an engine or a driving motor of the vehicle, and control of various in-vehicle electronic devices. The ECU 135 executes an operating system (OS) and various programs stored in a read-only memory (ROM) 134 by using a random access memory (RAM) 133 as a work memory.

The ECU 135 according to the present exemplary embodiment also has a function as an image processing device that generates an image to be displayed on the in-vehicle display 151 or the electronic rearview mirror 152 based on the rear image captured by the rear camera 121. That is, in the present exemplary embodiment, for example, the processing in functional units of a signal processing unit 103, a distortion correction unit 104, a cutout unit 106, an expansion processing unit 107, and a region determination unit 110 in FIG. 1A is executed by the ECU 135. For example, the ECU 135 uses the RAM 133 as a work memory and executes the programs according to the present exemplary embodiment stored in the ROM 134, thereby implementing the functions of the signal processing unit 103, the distortion correction unit 104, the cutout unit 106, the expansion processing unit 107, and the region determination unit 110.

An input device 153 is a user input device including various switches and buttons arranged in the vehicle and a touch panel provided in the in-vehicle display 151 and the electronic rearview mirror 152. A graphical user interface (GUI) (not illustrated) can be displayed on the in-vehicle display 151 or the electronic rearview mirror 152, and a user (for example, a driver or a fellow passenger) can input various instructions via the GUI. The input device 153 can include, for example, a function of acquiring an instruction by a user's voice. The input device 153 is connected to the information processing apparatus 130 by a communication I/F 138.

An external storage device 122 is a recording device that can record various kinds of data and information in a storage medium, such as a detachable memory card, and is connected to the information processing apparatus 130 via a communication I/F 132. The external storage device 122 stores, for example, a rear image captured by the rear camera 121, an image generated from the rear image for display on the in-vehicle display 151, and an image generated from the rear image for display on the electronic rearview mirror 152. The image recorded in the external storage device 122 can also be read and displayed on, for example, the in-vehicle display 151. The external storage device 122 can also be used to rewrite a program in the information processing apparatus 130.

A wireless communication apparatus 139 is a communication apparatus for performing wireless communication external to the information processing apparatus 130 by at least one of various wireless communication methods. The wireless communication apparatus 139 can wirelessly communicate programs, image data, and various other pieces of information. Programs to be communicated wirelessly can include the programs according to the present exemplary embodiment. Image data to be communicated wirelessly can include, for example, a rear image captured by the rear camera 121, an image generated from the rear image for display on the in-vehicle display 151, and an image generated from the rear image for display on the electronic rearview mirror 152.

The communication I/Fs 131, 132, 136, 137 138, the RAM 133, the ROM 134, the ECU 135, and the wireless communication apparatus 139 of the information processing apparatus 130 are connected to each other via a system bus.

Figures 2A, 2B:
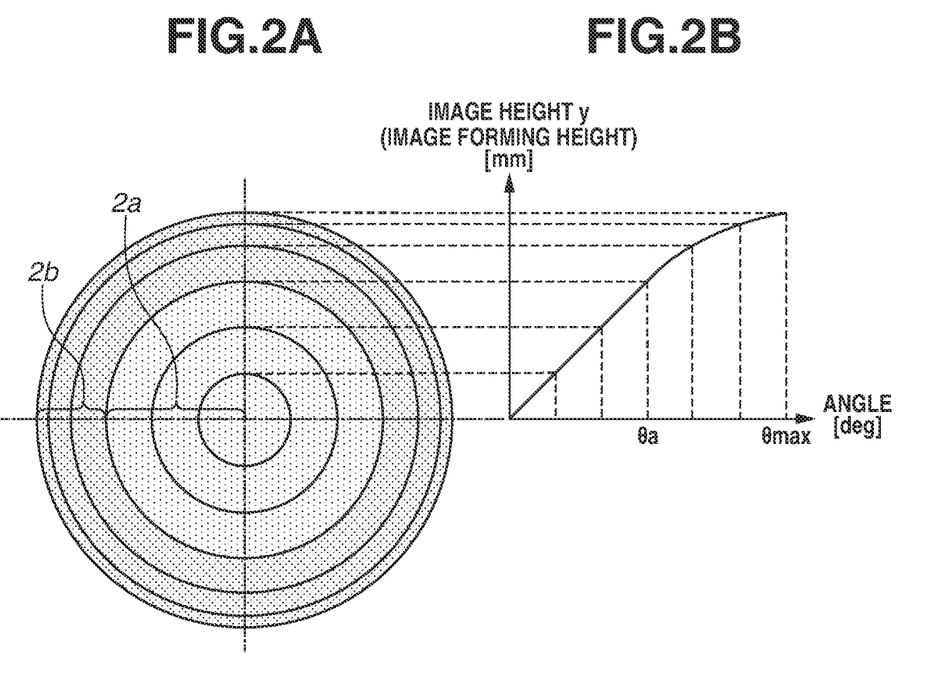
FIGS. 2A and 2B are diagrams illustrating optical characteristics (projection characteristics) of an optical system.

FIGS. 2A and 2B are diagrams illustrating optical characteristics of a lens system included in the optical system 101.

FIG. 2A is a diagram illustrating a range (image circle) of an optical image incident on the imaging surface of the image capture element 102 via the optical system 101, and illustrates a relationship between an angle θ formed by the optical axis of the optical system 101 and an incident light beam and an image height y on the imaging surface in a contour line shape per unit angle. FIG. 2B is a diagram illustrating projection characteristics indicating a relationship between an angle θ formed by the optical axis of the optical system 101 and an incident light beam and an image height y [mm] on the imaging surface of the image capture element 102. In FIG. 2B, the horizontal axis represents an angle θ formed by the optical axis of the optical system 101 and an incident light beam, and the vertical axis represents an image height y (image forming height) on the imaging surface of the image capture element 102. The angle θ max corresponds to a half angle of view.

As illustrated in FIG. 2B, the lens system included in the optical system 101 has different projection characteristics y (θ) in a region where an angle θ formed by the optical axis of the optical system 101 and an incident light beam is less than a predetermined angle θa and a region where the angle θ is greater than or equal to the predetermined angle θa in the half angle of view. In other words, the optical system 101 according to the present exemplary embodiment has a characteristic in which the amount of increase in the image height y on the imaging surface of the image capture element 102 is different between the region where the angle θ is less than the predetermined angle θa and the region where the angle θ is greater than or equal to the angle θa. In a case where the amount of increase in the image height y per unit angle of the angle θ formed by the optical axis of the optical system 101 and the incident light beam increases within the half angle of view, the number of pixels per unit angle increases, which corresponds to an increase in the resolution of the image on the imaging surface of the image capture element 102. Conversely, when the amount of increase in the image height y per unit angle decreases, the number of pixels per unit angle decreases, which corresponds to a decrease in the resolution of the image on the imaging surface of the image capture element 102. That is, in the optical system 101 according to the present exemplary embodiment, the resolution of the image on the imaging surface of the image capture element 102 is different between the region where the angle θ is less than the predetermined angle θa and the region where the angle θ is the angle θa or more. In the case of the optical system 101 according to the present exemplary embodiment, the region closer to the center, which is the region where the angle θ is less than the predetermined angle θa, is a high resolution region since the amount of increase in the image height y per unit angle is large. An outer region, which is the region where the angle θ is the predetermined angle θa or more, is a low resolution region since the amount of increase in the image height y per unit angle is small. In the optical system 101 according to the present exemplary embodiment, the predetermined angle θa is defined in advance as a first threshold. In the present exemplary embodiment, the region where the angle θ is less than the first threshold (less than the predetermined angle θa) is referred to as a high resolution region 2a, and the region where the angle θ is greater than or equal to the first threshold (greater than or equal to the predetermined angle θa) is referred to as a low resolution region 2b.

As illustrated in FIG. 2B, the amount of increase in the image height y on the imaging surface of the image capture element 102 is substantially constant in the region where the angle θ is less than the predetermined angle θa, but the amount of increase in the image height y is not constant in the region where the angle θ is greater than or equal to the predetermined angle θa (first threshold). This indicates that the distortion of the image is small in the region where the angle θ is less than the predetermined angle θa and the distortion of the image is large in the region where the angle θ is greater than or equal to the predetermined angle θa. That is, the high resolution region 2a having an angle θ smaller than the predetermined angle θa is a low distortion region in which distortion is relatively small compared with the low resolution region 2b, and the low resolution region 2b having an angle θ greater than or equal to the predetermined angle θa is a high distortion region in which distortion is relatively large compared with the high resolution region 2a. Therefore, in the present exemplary embodiment, the high resolution region 2a having an angle θ smaller than the predetermined angle θa is referred to as a low distortion region 2a, and the low resolution region 2b having an angle θ greater than or equal to the predetermined angle θa is referred to as a high distortion region 2b. That is, the low distortion region 2a is a region in which the optical distortion caused by the optical system 101 is less than the first threshold, whereas the high distortion region 2b is a region in which the optical distortion is greater than or equal to the first threshold. In other words, the first threshold is a threshold for the optical distortion in the optical system 101.

In the above description, the example in which the high resolution region 2a (low distortion region 2a) or the low resolution region 2b (high distortion region 2b) is determined based on whether an angle θ is less than the first threshold, or greater than or equal to the first threshold (θa) has been described. The present exemplary embodiment is not limited to this example. For example, a region including a region having the highest number of pixels per unit angle can be set as the high resolution region 2a (low distortion region 2a). In this case, a region in which the number of pixels per unit angle is smaller than a second threshold, which is smaller than the number of pixels per unit angle in the high resolution region 2a (low distortion region 2a), is set as the low resolution region 2b (high distortion region 2b).

The projection characteristic of the optical system 101 is not limited to the projection characteristic illustrated in FIG. 2B.

The image capture element 102 includes, for example, a complementary metal oxide semiconductor (CMOS) image sensor or a charge coupled device (CCD) image sensor, and acquires image data about each frame of the rear image by capturing an optical image formed on the imaging surface by the optical system 101. On the imaging surface of the image capture element 102, for example, color filters of three primary colors of red (R), green (G), and blue (B) are arranged for each pixel. The array of the RGB color filters is, for example, a Bayer array.

The signal processing unit 103 performs de-Bayer processing on the image data obtained by the image capture element 102 to convert the image data into RGB raster format image data. The signal processing unit 103 performs white balance adjustment, gain and offset adjustment, gamma processing, color matrix processing, reversible compression processing, and the like on the image data as necessary. Hereinafter, image data will be referred to as an image unless otherwise specified.

The distortion correction unit 104 performs processing for correcting distortion caused by the projection characteristics of the optical system 101 on the rear image processed by the signal processing unit 103. That is, the distortion correction unit 104 performs distortion correction processing corresponding to the distortion based on the projection characteristics of the optical system 101. The distortion correction unit 104 can have a plurality of distortion correction modes respectively corresponding to, for example, the central projection method ($y=f \cdot \tan \theta$), the equidistant projection method ($y=f \cdot \theta$), a combination of the plurality of projection methods, or another projection method, where f is the focal length of the optical system 101, and θ is the angle between the optical axis of the optical system 101 and the incident light beam. The distortion correction unit 104 can also perform distortion correction processing by selecting a distortion correction mode corresponding to the projection characteristics of the optical system 101 from the plurality of distortion correction modes. As an example of the distortion correction processing, there is processing in which lookup tables (LUTs) of correction coefficients corresponding to projection characteristics are provided for each distortion correction mode, and the position of each pixel is corrected, or the pixel is interpolated using the correction coefficient of the LUT selected therefrom. In addition to the example in which the LUT is used, for example, distortion correction processing may be performed in which a correction coefficient corresponding to the projection characteristics is calculated each time and the position of each pixel is corrected using the correction coefficient.

As described above, the first display unit 105 is the in-vehicle display 151. The in-vehicle display 151 displays the rear image on which the distortion correction is performed by the distortion correction unit 104. In the present exemplary embodiment, the rear image on which the distortion correction is performed by the distortion correction unit 104 is displayed on the first display unit 105, but a rear image on which the distortion correction is not performed can be displayed on the first display unit 105.

As described above, the second display unit 109 is the electronic rearview mirror 152. As described in detail below, the electronic rearview mirror 152 displays an image that is cut out from the rear image captured by the rear camera, and as described below, has been subjected to expansion processing at an expansion magnification corresponding to the distortion of the optical system 101. As described above, the image of the region cut out from the rear image is displayed on the electronic rearview mirror 152, and the cutout from the rear image is performed by the cutout unit 106.

The region determination unit 110 determines a region to be cut out by the cutout unit 106 from the rear image processed by the signal processing unit 103. In the present exemplary embodiment, the region determination unit 110 determines a cutout region that can be displayed on the electronic rearview mirror 152, which is the second display unit 109. Then, the cutout unit 106 cuts out a part of the image region from the rear image processed by the signal processing unit 103 based on the information about the cutout region determined by the region determination unit 110.

In the present exemplary embodiment, the region cut out by the cutout unit 106 is an image region that does not include the high distortion region 2b (low resolution region 2b) in which the distortion in the vertical direction is greater than or equal to the first threshold value in the rear image processed by the signal processing unit 103. That is, the cutout unit 106 cuts out an image region of the low distortion region 2a (high resolution region 2a) in which the distortion in the vertical direction is less than the first threshold from the rear image processed by the signal processing unit 103. The region cut out by the cutout unit 106 can be an image region including a region having the highest number of pixels per unit angle in the vertical direction in the rear image after the processing by the signal processing unit 103. In other words, the cutout unit 106 cuts out the rear image processed by the signal processing unit 103 so as not to include an image region having a pixel count less than or equal to a second threshold that is smaller than the pixel count per unit angle in the high resolution region 2a (low distortion region 2a).

The expansion processing unit 107 is an expansion processing unit that expands the image of the region cut out by the cutout unit 106 at an expansion magnification corresponding to the distortion of the optical system 101. For example, when the magnification of expansion is 1, no expansion processing is performed. When the magnification of expansion is a positive magnification greater than 1, expansion processing is performed. When the magnification of expansion is greater than 0 and less than 1, reduction processing is performed. In the example of the present exemplary embodiment, the expansion magnification is an expansion magnification for expanding an image in the horizontal direction. That is, in the present exemplary embodiment, the expansion processing unit 107 performs expansion processing to expand the image region cut out by the cutout unit 106 in the horizontal direction. In the present exemplary embodiment, the horizontal direction is a data readout direction of the image capture element 102.

In the example of the present exemplary embodiment, as described above, the cutout unit 106 cuts out an image region with less distortion in the vertical direction from the rear image processed by the signal processing unit 103. Therefore, the cut-out image region includes both the low distortion region 2a (high resolution region 2a) and the high distortion region 2b (low resolution region 2b) in the horizontal direction. The expansion processing unit 107 thus selects and applies the expansion processing at an expansion magnification suitable for each region to the low distortion region 2a and the high distortion region 2b in the image region cut out by the cutout unit 106. In the present exemplary embodiment, the expansion magnification can also be referred to as an expansion amount or an expansion coefficient. The expansion processing unit 107 according to the present exemplary embodiment can execute a plurality of (at least two) expansion processing having different expansion magnifications, and selects and applies expansion processing having an expansion magnification suitable for the low distortion region 2a and an expansion magnification suitable for the high distortion region 2b in the horizontal direction. Each expansion magnification in the plurality of pieces of expansion processing herein is a value determined in advance based on distortion based on the projection characteristics of the optical system 101. In the present exemplary embodiment, expansion processing at a magnification higher than an expansion magnification applied to the low distortion region 2a is applied to the high distortion region 2b.

As described above, the expansion processing unit 107 according to the present exemplary embodiment selects and applies the expansion processing at an expansion magnification corresponding to the magnitude of the distortion in the horizontal direction in the image region cut out by the cutout unit 106. That is, the expansion processing unit 107 performs the expansion processing on the image of the region that is cut out by the cutout unit 106 and includes the low distortion region 2a and the high distortion region 2b in the horizontal direction, based on the magnitude of the distortion in the horizontal direction. In the present exemplary embodiment, the expansion processing unit 107 divides the high distortion region for each unit angle, taking the resolution (image height (number of pixels) per unit angle) of the image in the low distortion region as the reference, and performs the expansion processing at an expansion magnification corresponding to the resolution of the reference image in the low distortion region for each unit angle. As a result, the image after the expansion processing by the expansion processing unit 107 becomes an image in which distortion in the horizontal direction is reduced.

In the above described example, the expansion magnifications in the plurality of pieces of expansion processing are predetermined magnifications. However, the expansion processing unit 107 can change the expansion magnification of the expansion processing based on a change in distortion in the horizontal direction of the cut-out image region. For example, the expansion processing unit 107 can change the expansion magnification based on the resolution of the image in the horizontal direction of the cut-out image region.

A storage unit 108 stores information about the optical characteristics (projection characteristics) of the optical system 101 as illustrated in FIG. 2B. In the present exemplary embodiment, the storage unit 108 stores, as the information about the optical characteristics of the optical system 101, for example, an LUT in which coordinates on the imaging surface of the image capture element 102 and image height data (the number of pixels) per unit angle are associated with each other. The expansion processing unit 107 acquires the image height per unit angle in the horizontal direction from the LUT of the storage unit 108 based on the coordinates on the imaging surface of the image capture element 102 corresponding to the image region cut out by the cutout unit 106. Here, as described above, since the image height per unit angle corresponds to the magnitude of distortion (in this case, distortion in the horizontal direction), the expansion processing unit 107 can determine the expansion magnification based on the magnitude of distortion in the horizontal direction. Thus, the expansion processing unit 107 can perform expansion processing at an expansion magnification corresponding to the magnitude of distortion in the horizontal direction of the image region cut out by the cutout unit 106.

The image cut out by the cutout unit 106 and expanded by the expansion processing unit 107 is then output to the second display unit 109. The second display unit 109 is the electronic rearview mirror 152 as described above. The image cut out by the cutout unit 106 and subjected to the expansion processing by the expansion processing unit 107, that is, the image in which the highly distorted region is removed in the vertical direction and the distortion is reduced by the expansion processing in the horizontal direction is, thus displayed on the electronic rearview mirror 152.

Figure 3:
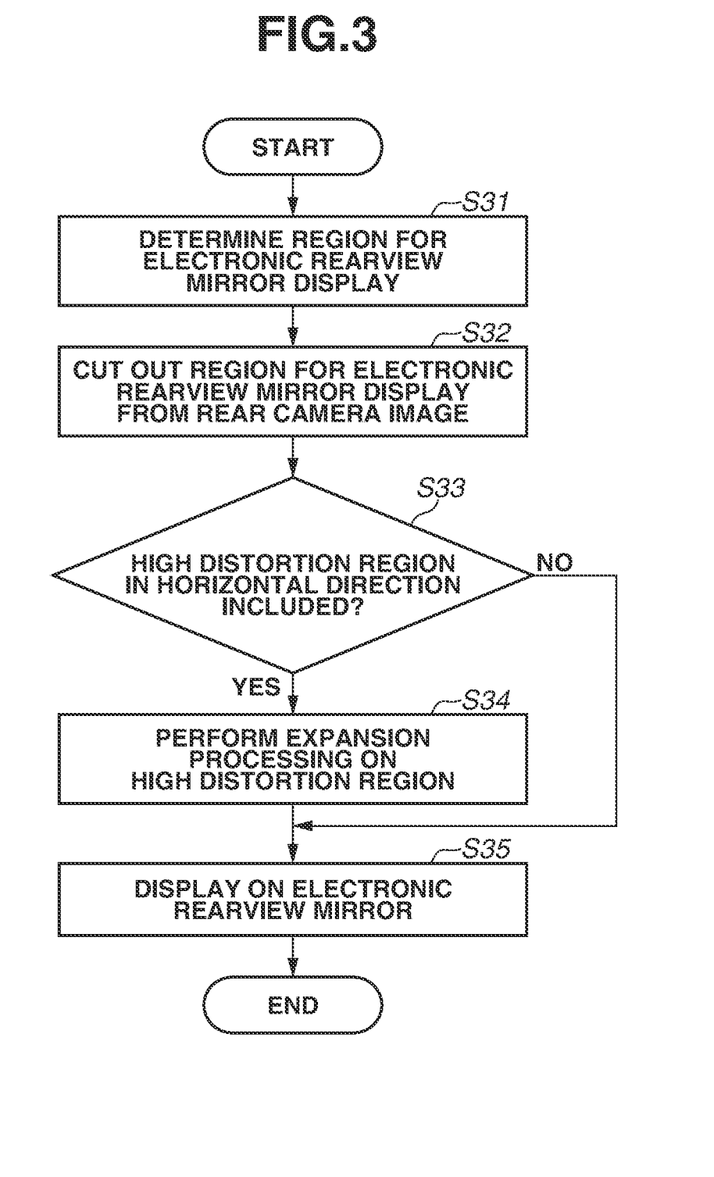
FIG. 3 is a flowchart illustrating electronic rearview mirror display processing according to the first exemplary embodiment.

FIG. 3 is a flowchart illustrating a procedure of processing in each of the above-described functional units after the processing performed by the cutout unit 106 included in the image processing apparatus 100 according to the first exemplary embodiment.

First, in step S31, the region determination unit 110 determines a cutout region for cutting out an image to be displayed on the electronic rearview mirror 152 from an image captured by the rear camera 121.

In the present exemplary embodiment, the cutout region can be set in advance as an initial value, or can be a cutout region set last at the time of the previous activation. Coordinate values of the image can be used as values for setting the cutout region. The region determination unit 110 can also set a cutout region based on a value designated by the user via the input device 153. An instruction by the user can be assumed to be an instruction to perform a translation operation on the cutout region in any direction by any amount on the rear image displayed on the in-vehicle display 151. An instruction by the user can also be assumed to be, for example, an instruction in which the user touches a desired cutout region via, for example, a touch panel in the rear image displayed on the in-vehicle display 151. Any method of determining the cutout region can be used as long as a region to be displayed on the electronic rearview mirror 152 can be determined from the rear image processed by the signal processing unit 103.

Figure 4A:
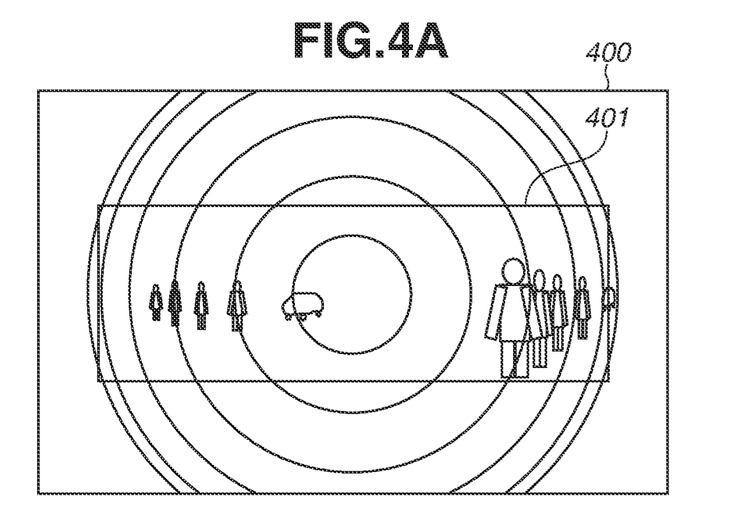
FIGS. 4A and 4B are diagrams illustrating cutout and expansion processing according to the first exemplary embodiment.

FIG. 4A illustrates an example of an image 400 captured by the image capture element 102 and processed by the signal processing unit 103, and a cutout region 401 determined to be a region to be displayed on the electronic rearview mirror 152 with respect to the image 400. The image 400 is a rear image formed and captured on the imaging surface of the image capture element 102 by the optical system 101 having the optical characteristics illustrated in FIG. 2 described above. The lines of the circles drawn in the image 400 are lines indicating virtual circles representing the image heights for each unit angle illustrated in FIG. 2A in the form of contour lines, and are not lines actually existing in the image. In the image 400 in FIG. 4A, the inside of the outermost virtual circle is a region of an optical image formed on the imaging surface by the optical system 101, and the outside of the outermost virtual circle is a region of a black image in which no optical image exists (no incident light exists).

Returning to FIG. 3, next, in step S32, the cutout unit 106 cuts out the image of the cutout region 401 determined to be the region to be displayed on the electronic rearview mirror 152 in step S31 from the image 400 of FIG. 4A.

In step S33, the expansion processing unit 107 determines whether the image region cut out in step S32 includes a high distortion region in the horizontal direction. In the present exemplary embodiment, whether a high distortion region is included in the horizontal direction is known in advance from the projection characteristics of the optical system 101. If it is determined in step S33 that the high distortion region is not included, the processing of the information processing system 100 proceeds to step S35. If it is determined that a high distortion region is included, the expansion processing unit 107 advances the processing to step S34, and performs horizontal direction expansion processing on the cut-out image region. In the present exemplary embodiment, since the cut-out image region includes the high distortion region in the horizontal direction as described above, the processing proceeds to step S34.

In step S34, the expansion processing unit 107 performs the expansion processing on the cut-out image region as described above. That is, the expansion processing unit 107 divides the high distortion region for each unit angle based on the resolution (image height (the number of pixels) per unit angle) of the image in the low distortion region, and performs the processing of expanding the high distortion region so as to make the resolutions correspond to the resolution of the reference image in the low distortion region for each unit angle. An image 402 illustrated in FIG. 4B is an image obtained by horizontally expanding an image region cut out based on the cutout region 401 in FIG. 4A.

In the above described example, the example in which the expansion processing is performed by further changing the expansion magnification in the high distortion region based on the resolution of the image has been described. However, the expansion processing can be uniformly performed on the high distortion region at a constant magnification. For example, the expansion processing can be performed on the low distortion region so that the resolution of the entire image becomes uniform.

Figure 4B:
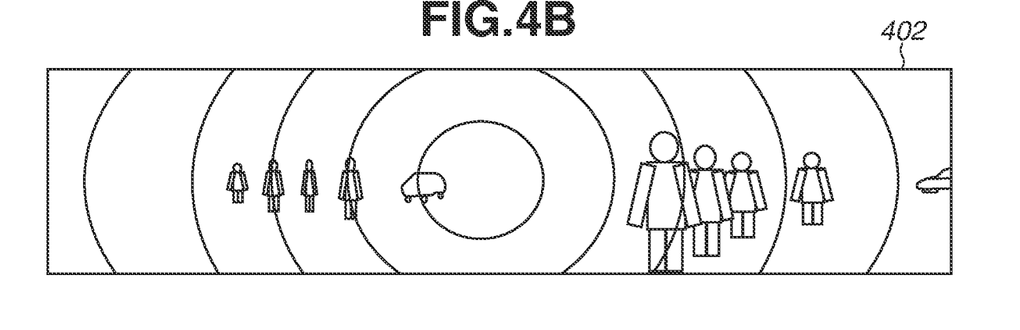

In step S35, the expansion processing unit 107 outputs the image 402 illustrated in FIG. 4B to the electronic rearview mirror 152, which is the second display unit 109, to be displayed. At this time, the expansion processing unit 107 can perform the expansion processing at a uniform magnification in both the horizontal direction and the vertical direction based on the display resolution and the aspect ratio of the electronic rearview mirror 152.

Figure 5A:
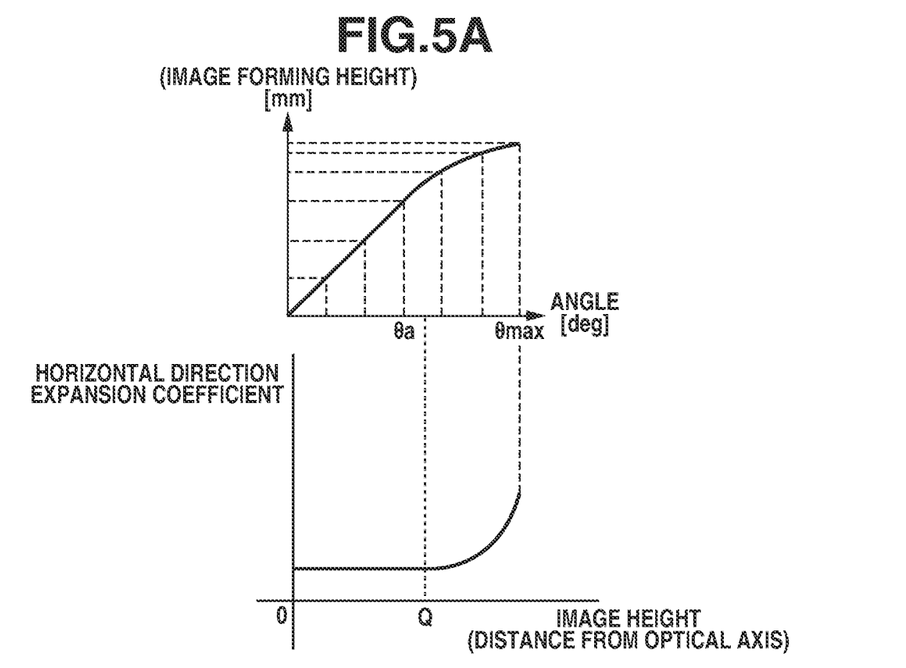
FIGS. 5A and 5B are diagrams illustrating an expansion coefficient (expansion magnification).

FIG. 5A is a diagram illustrating an example of setting an expansion coefficient as a value representing a horizontal direction expansion magnification for the example of the image heights and the angle θ illustrated in FIG. 2B. The expansion processing unit 107 changes the expansion coefficient taking a point Q in the diagram as the reference. It is desirable that the point Q corresponds to the predetermined angle θa at which the projection characteristic changes, but the point Q may not correspond to the predetermined angle θa. In the example of FIG. 5A, the expansion processing in the horizontal direction is expansion processing using a constant expansion coefficient up to a reference image height (point Q in FIG. 5A), and thereafter is expansion processing using expansion coefficients that increase based on the amount of change in image height.

In the present exemplary embodiment, the cutout by the cutout unit 106 is performed based on the display of the electronic rearview mirror 152 so that the high distortion region is not included in the vertical direction, and therefore, the expansion processing in the vertical direction is not performed. The present disclosure is not limited to this example, and the expansion processing can also be performed in the vertical direction in a case where the cutout is performed such that the high distortion region is included in the vertical direction.

Figure 5B:
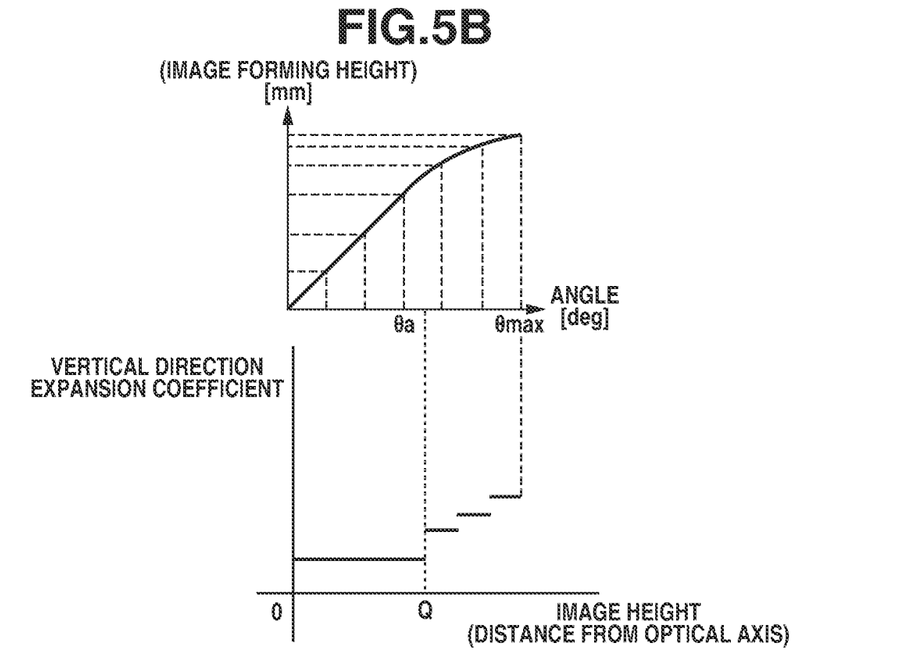

FIG. 5B is a diagram illustrating an example of setting the expansion coefficient in the vertical direction for the example of the image heights and the angle θ illustrated in FIG. 2B. The expansion processing in the vertical direction may not be the processing performed in the horizontal direction by the expansion processing unit 107 described above. For example, as illustrated in FIG. 5B, the expansion processing in the vertical direction can be expansion processing using a first expansion coefficient up to a reference image height (point Q in FIG. 5B), and thereafter, using expansion coefficients switched to a second expansion coefficient and a third expansion coefficient as the image height increases.

The expansion processing in the expansion processing unit 107 according to the present exemplary embodiment can be performed by, for example, adjusting the read timing of a line memory (not illustrated). That is, the low resolution of the image can be easily corrected by extending the reading timing (cycle) as the resolution of the image becomes lower. For example, the expansion processing can be easily performed by periodically reading the line memory a plurality of times. In this example, since the expansion processing can be performed by the timing adjustment of the reading only, the expansion processing can be performed without preparing a dedicated circuit for performing the expansion/compression with high image quality.

As described above, in the first exemplary embodiment, the image displayed on the in-vehicle display 151 is an image obtained by performing the distortion correction processing on the rear image including the high distortion region and the low distortion region captured via the optical system 101. The image displayed on the electronic rearview mirror 152 is an image obtained by performing expansion processing (expansion processing in the example of the present exemplary embodiment) on an image region cut out from the rear image before the distortion correction processing at an expansion magnification corresponding to the distortion of the optical system 101. That is, in the first exemplary embodiment, the electronic rearview mirror 152 displays an image in which the distortion of the image in the high distortion region is made inconspicuous by expanding the image in the horizontal direction at an expansion magnification corresponding to the distortion of the image. In the present exemplary embodiment, since the processing for the image to be displayed on the electronic rearview mirror 152 is the expansion processing using an expansion magnification, the processing delay is small as compared with the case where the distortion correction processing is performed, thereby enabling display at a desired high frame rate. The expansion processing on the image for the electronic rearview mirror is expansion processing only in one direction that is the horizontal direction, and therefore, the circuit scale of the expansion processing unit 107 can be smaller than that of a distortion correction circuit, such as the distortion correction unit 104.

An information processing system according to a second exemplary embodiment will be described below. Differences from the first exemplary embodiment will be mainly described.

Figure 6:
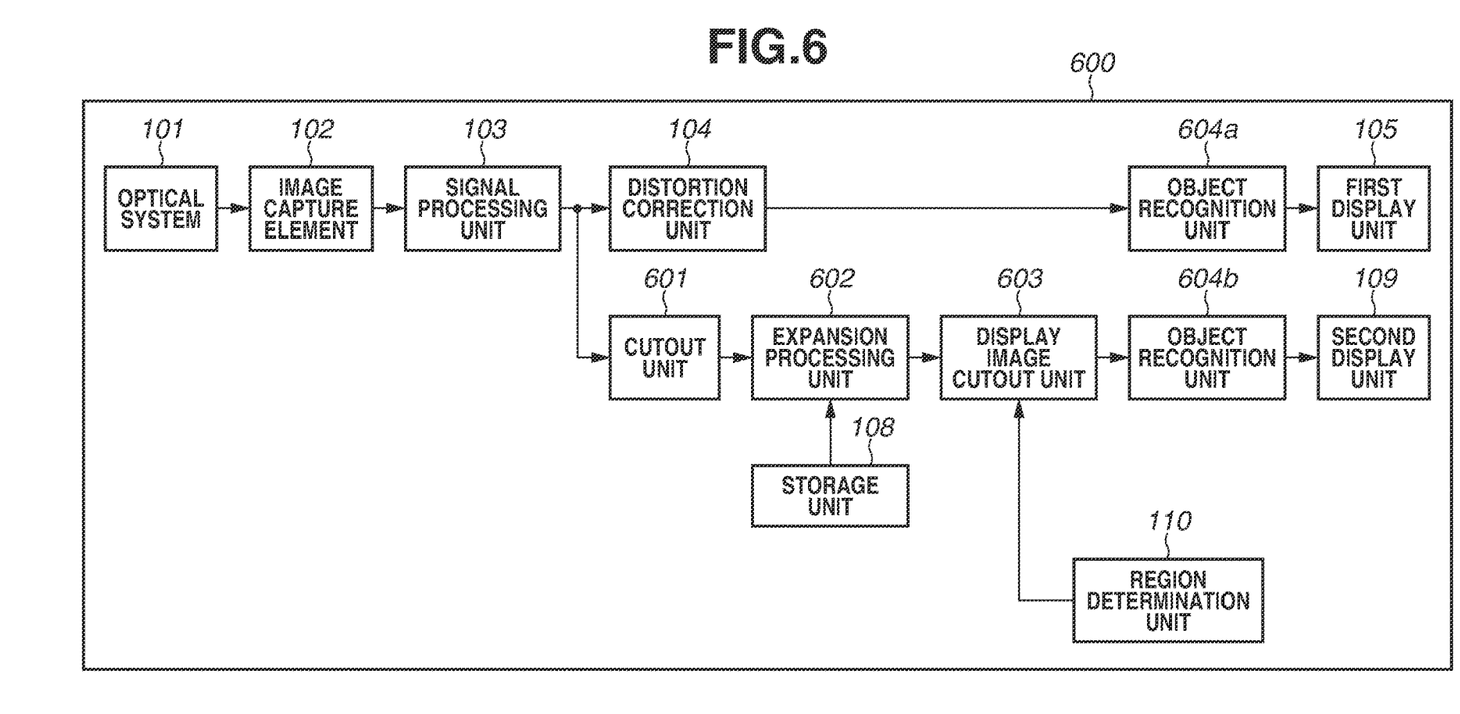
FIG. 6 is a diagram illustrating a functional configuration example of a second exemplary embodiment.

FIG. 6 is a block diagram illustrating a main functional configuration of an information processing system 600 including an image processing apparatus according to the second exemplary embodiment. In the information processing system 600 in FIG. 6, the optical system 101, the image capture element 102, the signal processing unit 103, the distortion correction unit 104, the storage unit 108, the region determination unit 110, the first display unit 105, and the second display unit 109 are the same as those illustrated in FIG. 1 described above, and thus the description thereof will be omitted. The hardware configuration of the information processing system 600 according to the second exemplary embodiment is the same as that in FIG. 1B, and thus the illustration and description thereof will be omitted.

The cutout unit 106 according to the first exemplary embodiment described above performs processing of cutting out an image based on the cutout region determined by the region determination unit 110. The cutout unit 601 according to the second exemplary embodiment cuts out, in the horizontal direction, a region with low distortion in the vertical direction from the rear image processed by the signal processing unit 103. In other words, the cutout unit 601 cuts out an image region obtained by excluding a high distortion region in the vertical direction from the rear image processed by the signal processing unit 103.

In the second exemplary embodiment, an expansion processing unit 602 performs expansion processing on the region with low distortion in the vertical direction cut out by the cutout unit 601, and the image after the expansion processing is sent to a display image cutout unit 603. The display image cutout unit 603 cuts out an image of the cutout region determined by the region determination unit 110 from the image after the expansion processing by the expansion processing unit 602. That is, in the second exemplary embodiment, the image displayed on the electronic rearview mirror 152, which is the second display unit 109, is an image cut out by the display image cutout unit 603.

In the second exemplary embodiment, object recognition units 604a and 604b are provided.

The object recognition unit 604a performs object recognition processing on the rear image on which the distortion correction processing has been performed by the distortion correction unit 104, that is, the image to be displayed on the in-vehicle display 151, which is the first display unit 105, and superimposes the object recognition result on the image. The object recognition unit 604b performs object recognition processing on the image cut out by the display image cutout unit 603, that is, the image to be displayed on the electronic rearview mirror 152, which is the second display unit 109, and superimposes the object recognition result on the image. As the object recognition processing, for example, object recognition processing using a model trained in advance or processing of discriminating a background and a moving object from a difference between frames, such as by a background difference method, and recognizing the moving object, can be used. The object recognition processing is performed to detect an object approaching the vehicle on which the information processing system 600 according to the present exemplary embodiment is mounted, and the object recognition result is displayed on the in-vehicle display 151 or the electronic rearview mirror 152. Thus, when there is an object approaching the vehicle, the drive of the vehicle according to the present exemplary embodiment can recognize the approach of the object.

Figure 7:
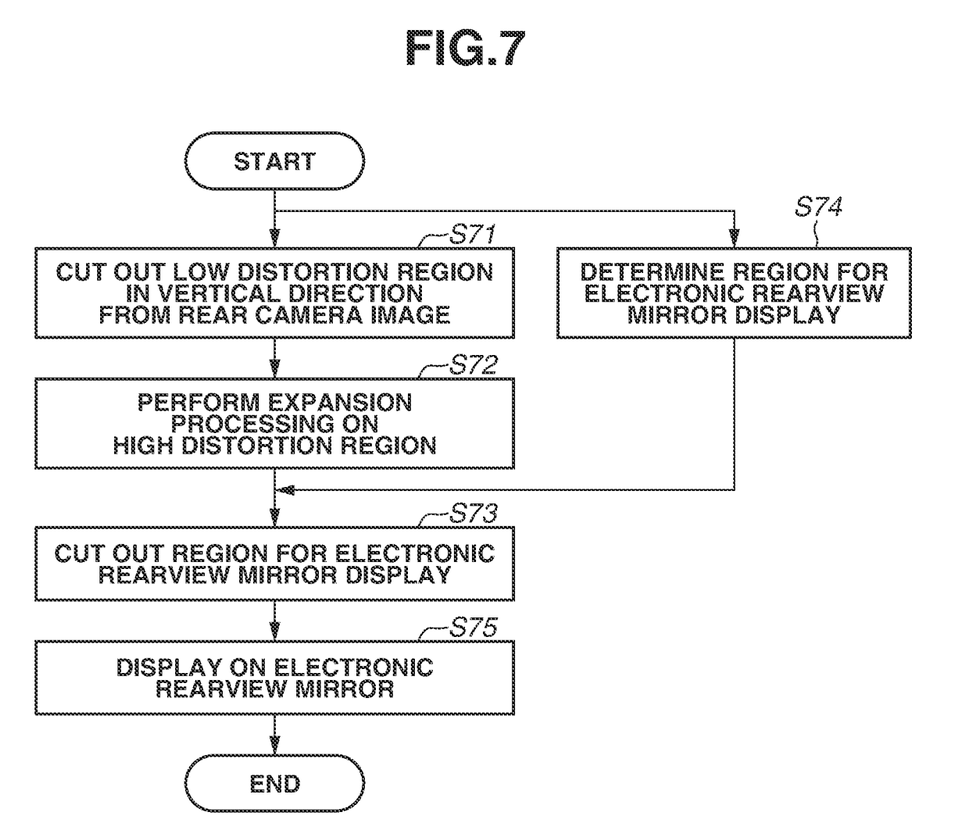
FIG. 7 is a flowchart of electronic rearview mirror display processing according to the second exemplary embodiment.

FIG. 7 is a flowchart illustrating a procedure of processing in each functional unit after the processing performed by the cutout unit 601 included in the image processing apparatus according to the second exemplary embodiment.

In step S74, the region determination unit 110 determines a cutout region to be displayed on the electronic rearview mirror 152 in the same manner as in step S31 of FIG. 3 described above. In the second exemplary embodiment, information indicating the cutout region determined by the region determination unit 110 is sent to the display image cutout unit 603. After step S74, the processing in the information processing system 600 proceeds to step S73.

In the second exemplary embodiment, in step S71, the cutout unit 601 performs processing of horizontally cutting out a region having low distortion in the vertical direction, that is, cutting out a region excluding a region having high distortion in the vertical direction, from the rear image processed by the signal processing unit 103.

Figure 8A:
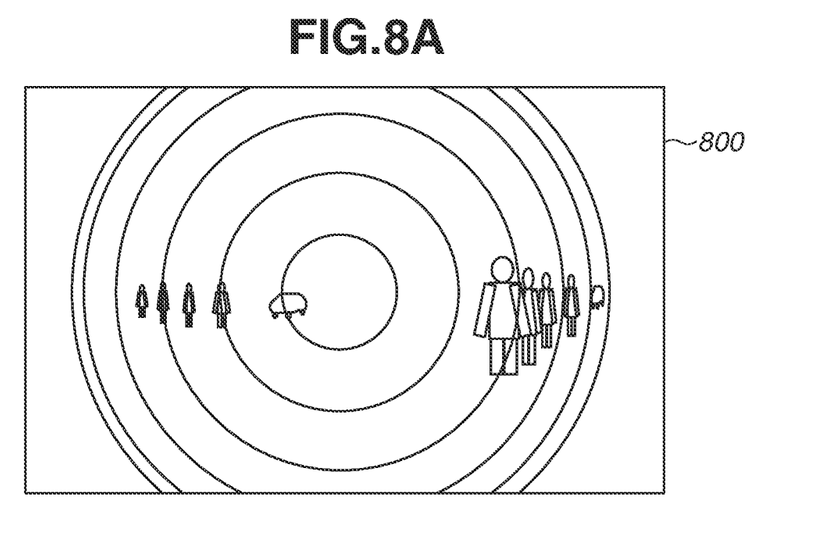
FIGS. 8A to 8C are diagrams illustrating cutout and expansion processing according to the second exemplary embodiment.
Figure 8B:
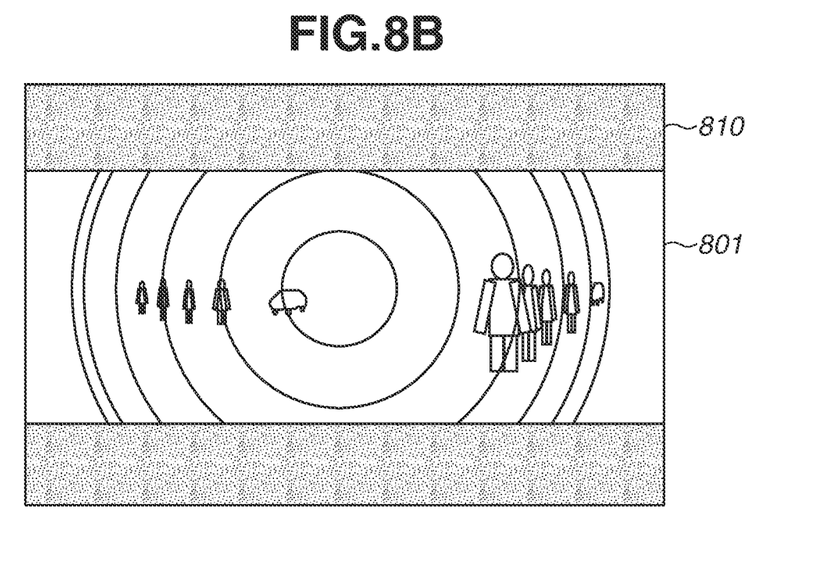
Figure 8C:
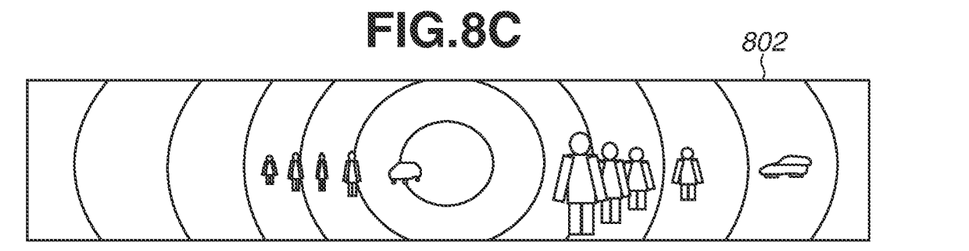

FIGS. 8A to 8C are diagrams illustrating the cutout processing performed by the cutout unit 601 according to the second exemplary embodiment.

An image 800 in FIG. 8A is a rear image captured by the image capture element 102 and processed by the signal processing unit 103. Similar to the image 400 of FIG. 4A, in the image 800 of FIG. 8A, the inside of the outermost virtual circle is a region of the optical image formed by the optical system 101, and the outside of the outermost virtual circle is a black image region in which the optical image does not exist.

In the second exemplary embodiment, the cutout unit 601 horizontally cuts out a region having low distortion in the vertical direction in the image 800 of FIG. 8A. FIG. 8B is a diagram illustrating the image 800 of FIG. 8A with a region other than a region 801 having low distortion in the vertical direction masked. In the second exemplary embodiment, as in the first exemplary embodiment, the low distortion region is a region where the distortion is less than a first threshold, and the high distortion region is a region where the distortion is greater than or equal to the first threshold. Alternatively, the low distortion region is a region including a region where the number of pixels per unit angle is the highest, and the high distortion region is a region where the number of pixels per unit angle is less than or equal to a second threshold smaller than the number of pixels per unit angle in the low distortion region.

In the example of the image 800 of FIG. 8A, since the region closer to the center is the low distortion region as described above with reference to FIG. 2, the region 801 excluding the mask portion 810 of FIG. 8B is the low distortion region in the vertical direction. The mask portion 810 in FIG. 8B is drawn for easy understanding of a low distortion region in the vertical direction on the drawing, and the image 800 is not actually masked. The image 800 can actually be masked. In the second exemplary embodiment, the cutout unit 601 performs cutout processing of cutting out a region with low distortion in the vertical direction, that is, a region 801 excluding the mask portion 810 illustrated in FIG. 8B, from the image 800 of FIG. 8A. Then, after the processing in step S71, the processing of the information processing system 600 proceeds to step S72.

In step S72, the expansion processing unit 602 horizontally expands the vertically low distortion region 801 cut out in step S71. The expansion processing in the expansion processing unit 602 is the same as that described in the first exemplary embodiment. That is, the expansion processing unit 602 divides the high distortion region for each unit angle taking the resolution (the image height (the number of pixels)) per unit angle) of the image of the low distortion region as the reference, and expands the high distortion region so as to correspond to the resolution of the reference image. After step S71, the processing of the information processing system 600 proceeds to step S73.

In step S73, the display image cutout unit 603 cuts out the cutout region determined by the region determination unit 110, that is, the image of the region corresponding to the electronic rearview mirror 152, from the image after the expansion processing by the expansion processing unit 602.

FIG. 8C is a diagram illustrating an image 802 cut out by the display image cutout unit 603 from the image after the expansion processing by the expansion processing unit 602. That is, in the second exemplary embodiment, the image 802 is an image cut out in based on the cutout region determined by the region determination unit 110 after the image of the region 801 cut out as a region with low distortion in the vertical direction from the image 800 of FIG. 8A is subjected to expansion processing. At this time, the display image cutout unit 603 can perform the expansion processing at a uniform magnification in both the horizontal direction and the vertical direction in accordance with the display resolution and the aspect ratio of the electronic rearview mirror 152.

In step S75, the image 802 cut out by the display image cutout unit 603 is displayed on the electronic rearview mirror 152 of the second display unit 109 after being subjected to the object recognition processing by the object recognition unit 604*b*.

In the second exemplary embodiment, a region with low distortion in the vertical direction is cut out from a rear image on which distortion correction has not been performed, and an image cut out from an image obtained by performing expansion processing in the horizontal direction on the image of the region with low distortion in the vertical direction is displayed on the electronic rearview mirror 152. Thus, as in the first exemplary embodiment, the electronic rearview mirror 152 can display an image in which deformation of an image captured in a highly distorted region is reduced.

In the second exemplary embodiment, the object recognition unit 604*a* performs object recognition from an image after distortion correction by the distortion correction unit 104, and the object recognition unit 604*b* performs object recognition from an image obtained by horizontally expanding an image of a vertically low distortion region. That is, for example, in a case where recognition is performed using an image of an object that is deformed due to distortion, there is a concern that recognition accuracy can decrease. In contrast, in the present exemplary embodiment, object recognition is performed using an image in which distortion is reduced, that is, an image in a state in which deformation of the object in the image is reduced. Thus, according to the present exemplary embodiment, it is possible to perform highly accurate object recognition in which a decrease in object recognition accuracy is suppressed.

Other Embodiments

The object recognition described in the second exemplary embodiment is also applicable to the first exemplary embodiment. When object recognition is applied to the first exemplary embodiment, an object recognition unit can be arranged at the subsequent stage of the distortion correction unit 104 and the subsequent stage of the expansion processing unit 107.

In the above described exemplary embodiment, whether the rear image is the high distortion region or the low distortion region is determined based on the resolution of the image per unit angle. However, for example, the determination can be performed based on the optical distortion defined by the following Expression:

$$((Y-Y')/Y')*100(\%) \quad \text{Expression (1)}$$

In Expression (1), Y is an actual image height, Y' is an ideal image height, Y'=f*tan θ, f is a focal length of the optical system 101, and θ is an angle formed by an optical axis of the optical system 101 and an incident light beam.

In the information processing system according to each of the above described exemplary embodiments, for example, the image displayed on the in-vehicle display 151 can be switchable to an image of a region to be noted, such as a region directly behind the vehicle or a region below the vehicle. Then, when the image is displayed on the in-vehicle display 151, appropriate distortion correction can be performed on both the image directly behind the vehicle and the image of the region of interest, such as the lower side. In each of the above described exemplary embodiments, the image displayed on the electronic rearview mirror 152 is an image of a region cut out from an image on which distortion correction processing has not been performed. Therefore, even when the distortion correction method for the image displayed on the in-vehicle display 151 is appropriately switched, the switching does not affect the display of the electronic rearview mirror 152, and thus the usability is not impaired.

The present disclosure can also be implemented by processing in which a program for implementing one or more functions of the above described exemplary embodiments is supplied to a system or an apparatus via a network or a storage medium, and one or more processors in a computer of the system or the apparatus read and execute the program. In addition, the present disclosure can be implemented by a circuit (for example, an application specific integrated circuit (ASIC)) that implements one or more functions.

The above described exemplary embodiments are merely examples for embodying the present disclosure, and the technical scope of the present disclosure should not be interpreted in a limited manner by these exemplary embodiments.

The present disclosure can be implemented in various forms without departing from the technical idea or the main features thereof.

The present disclosure enables display of an easily visible image while reducing in increase in circuit size and cost, and delay in processing time.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2022-124713, filed Aug. 4, 2022, which is hereby incorporated by reference herein in its entirety.

What is claimed is:

1. An image processing apparatus comprising:
one or more memories storing instructions; and
one or more processors executing the instructions to:
acquire a first image obtained by capturing an optical image by an optical system including a high distortion region in which distortion is large and a low distortion region in which distortion is small;
cut out a partial image region from the first image to acquire a second image; and
expand the second image by an expansion magnification corresponding to distortion of the optical system,
wherein the second image subjected to the expansion is output to a display device,
wherein the low distortion region of the optical system is a region in which the distortion of the optical system is less than a first threshold,
wherein the high distortion region of the optical system is a region in which the distortion of the optical system is greater than or equal to the first threshold, and
wherein the one or more processors further execute the instruction to perform cutout from the first image so as not to include an image region in which distortion in a vertical direction is greater than or equal to the first threshold.

2. The image processing apparatus according to claim 1, wherein the one or more processors further execute the instructions to perform correction processing on the first image based on projection characteristics of the optical system, and wherein a corrected first image is output to another display device different from the display device.

3. The image processing apparatus according to claim 2, wherein the one or more processors further execute the instructions to perform correction processing for correcting distortion of an image based on projection characteristics of the optical system.

4. The image processing apparatus according to claim 3, wherein recognition processing of recognizing an object from the image output to the display device is performed, and a result of recognition by the recognition processing is superimposed on the image output to the display device.

5. The image processing apparatus according to claim 1, wherein the one or more processors further execute the instructions to expands the second image at a magnification by which a number of pixels per unit angle in the high distortion region corresponds to a reference number of pixels, wherein the reference number of pixels is a number of pixels per unit angle within an angle of view in the low distortion region.

6. The image processing apparatus according to claim 1,
wherein the low distortion region of the optical system is a region including a region in which a number of pixels per unit angle in an angle of view is highest, and
wherein the high distortion region of the optical system is a region in which the number of pixels per unit angle in an angle of view is less than or equal to a second threshold that is a value smaller than the number of pixels per unit angle in the low distortion region.

7. The image processing apparatus according to claim 6, wherein the one or more processors further execute the instructions to cut out, from the first image, an image region that does not include a region in which the number of pixels per unit angle in a vertical direction in the angle of view is less than or equal to the second threshold, which is a value smaller than the number of pixels per unit angle in the low distortion region.

8. The image processing apparatus according to claim 7, wherein the one or more processors further execute the instructions to expand the second image at a magnification at which a resolution for each unit angle in the high distortion region corresponds to a reference resolution, wherein the reference resolution is a resolution per unit angle in the low distortion region.

9. The image processing apparatus according to claim 1, wherein the one or more processors further execute the instructions to change a magnification of the expansion based on a change in the distortion in the second image.

10. The image processing apparatus according to claim 1, wherein the one or more processors further execute the instructions to expand the second image in a horizontal direction based on the expansion magnification.

11. The image processing apparatus according to claim 1, wherein the one or more processors further execute the instructions to expand the second image only when the high distortion region is included in the image region cut out by the cutout unit.

12. An image processing method comprising:
acquiring a first image obtained by capturing an optical image by an optical system including a high distortion region in which distortion is large and a low distortion region in which distortion is small;
acquiring a second image obtained by cutting out a partial image region from the first image;
expanding the second image at an expansion magnification corresponding to distortion of the optical system; and
outputting the second image subjected to the expansion to a display device,
wherein the low distortion region of the optical system is a region in which the distortion of the optical system is less than a first threshold,
wherein the high distortion region of the optical system is a region in which the distortion of the optical system is greater than or equal to the first threshold, and
wherein the one or more processors further execute the instruction to perform cutout from the first image so as not to include an image region in which distortion in a vertical direction is greater than or equal to the first threshold.

13. A non-transitory computer-readable storage medium storing a program that causes a computer to execute a method, the method comprising:
acquiring a first image obtained by capturing an optical image by an optical system including a high distortion region in which distortion is large and a low distortion region in which distortion is small;
acquiring a second image by cutting out a partial image region from the first image;
expanding the second image at an expansion magnification corresponding to distortion of the optical system; and
outputting the second image subjected to the expansion to a display device,
wherein the low distortion region of the optical system is a region in which the distortion of the optical system is less than a first threshold,
wherein the high distortion region of the optical system is a region in which the distortion of the optical system is greater than or equal to the first threshold, and
wherein the one or more processors further execute the instruction to perform cutout from the first image so as not to include an image region in which distortion in a vertical direction is greater than or equal to the first threshold.

* * * * *